June 8, 1943.                J. E. SMITH                2,321,429
                        KING PIN ARRANGEMENT
                    Filed April 2, 1941            2 Sheets-Sheet 1

INVENTOR
JOHN EDGAR SMITH
BY

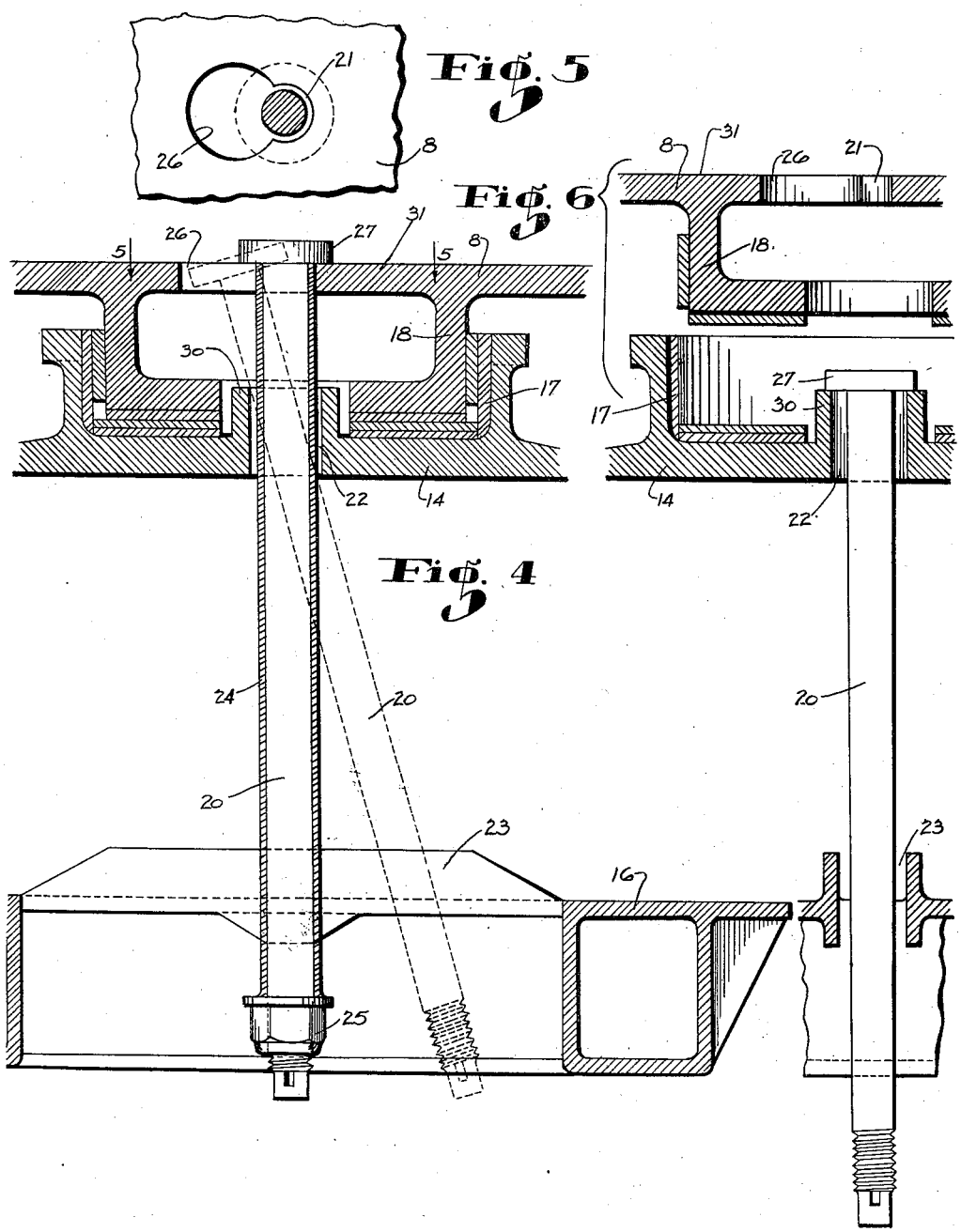

Patented June 8, 1943

2,321,429

UNITED STATES PATENT OFFICE 2,321,429

KINGPIN ARRANGEMENT

John Edgar Smith, Springfield, Pa., assignor to The Baldwin Locomotive Works, a corporation of Pennsylvania Application April 2, 1941, Serial No. 386,492

8 Claims. (Cl. 105—200)

This invention relates generally to railway vehicles and more particularly to an improved king pin arrangement that is especially applicable for locomotives.

Various king pin arrangements have been heretofore proposed and used for minimizing the extent to which the locomotive frame must be lifted above or moved laterally relative to the truck to allow removal or insertion of the king pin. In one such prior arrangement the main frame of the vehicle, such as the locomotive underframe, has been provided with a pair of overlapping holes, one of which is large enough to receive the head of the king pin bolt and the other small enough to receive only the bolt shank. In addition the bolt and underframe were so related that the underframe had to be placed in a raised off-center position with respect to the center pin bearing in order to allow the king bolt to be inserted into said enlarged opening. Thereafter either the truck or underframe was required to be moved laterally relative to each other to bring the center pin and its bearing into normal aligned position whereupon the underframe was lowered to seat the center pin. This arrangement had the serious disadvantage that it was necessary to suspend the underframe above the truck in an offset position while placing the king bolt in a preliminary position and then shift the truck or frame laterally into aligned position to effect a locking position of the king bolt and thereafter lowering the underframe to seat the center pin in its seat. In view of the massiveness of the underframe and truck, it is seen that the foregoing operation was cumbersome and required appreciable time and effort.

It is an object of my invention to provide an improved combination of elements whereby the king pin may be readily and conveniently placed in or removed from its operative position with the underframe together with means for positively holding the king pin in said position.

A further object is to provide an improved combination whereby the king pin may be placed in or removed from its operative position while the center pin is in its normally seated position in the center pin bearing thereby eliminating the necessity for relatively laterally shifting the truck and frame into vertical alignment and then lowering the center pin into its seal, all as part of the king pin operation such as was heretofore required in the prior art.

Another object is to provide an improved king pin arrangement that is relatively simple and economical in construction, operation and maintenance and yet has a high degree of ruggedness, stability and safety.

Other objects and advantages will be more apparent to those skilled in the art from the following description of the accompanying drawings in which:

Fig. 4 is an enlarged fragmentary section of the king pin and associated portions of the truck and underframe, similar to the section shown in Fig. 2;

Fig. 5 is a fragmentary plan view taken substantially on the lines 5—5 of Fig. 4; and Fig. 6 is a fragmentary section similar to Fig. 4 but showing the manner in which the center pin may be lowered into the center pin bearing or removed therefrom independently of the king pin.

Figure 1:
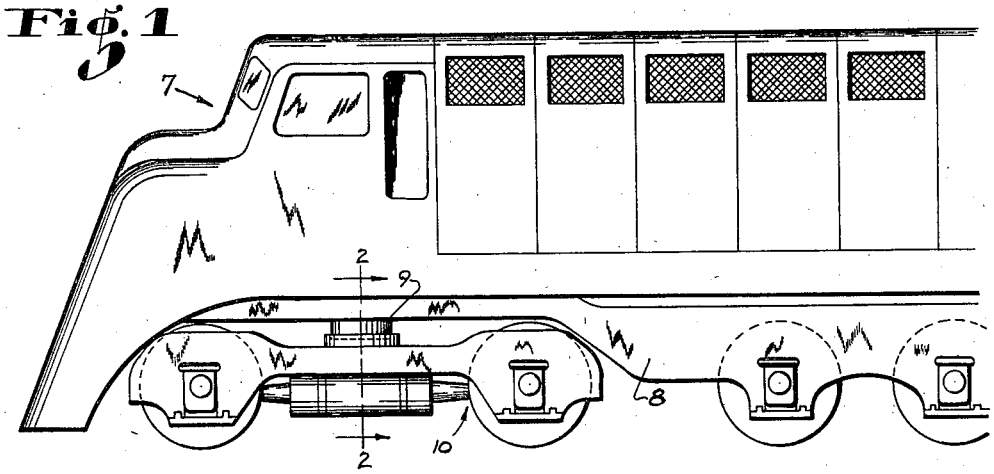
Fig. 1 is a side elevation of one end of a locomotive employing my improved king pin combination.
Figure 2:
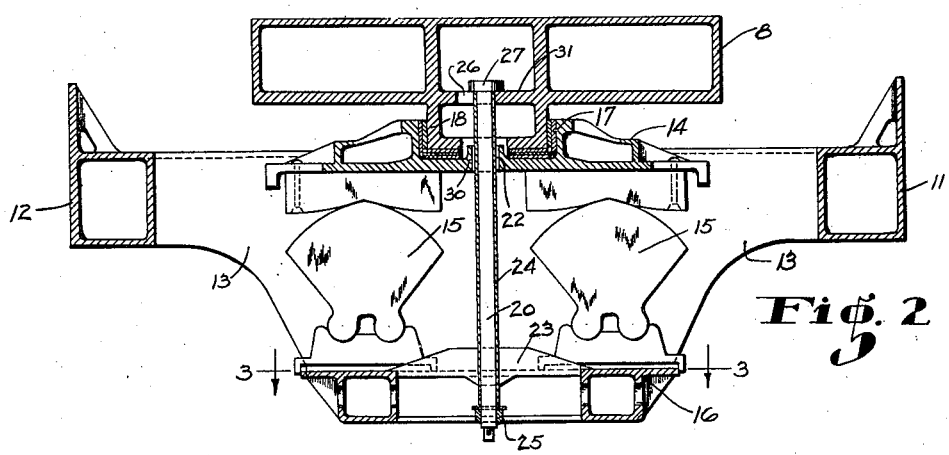
Fig. 2 is a vertical transverse section taken substantially on the line 2—2 of Fig. 1 but omitting certain elements for sake of clarity.
Figure 3:
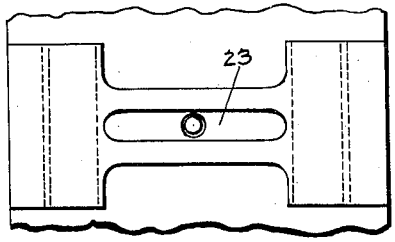
Fig. 3 is a section taken substantially on the line 3—3 of Fig. 2.

In the particular embodiment of the invention disclosed herein, I have shown for purposes of illustration a usual Diesel-electric type locomotive generally indicated at 7 having a conventional cab underframe 8 mounted through a center pin structure 9 upon a truck 10. As shown in Fig. 2 the truck has usual wheel pieces 11 and 12 connected by transoms or other cross members 13 adapted to support a usual swing bolster 14 upon transverse centering devices 15 which are, in turn, supported upon a suitable horizontal transom portion 16. The swing bolster 14 has a usual center pin bearing 17 in which is seated a center pin 18 projecting downwardly from and, if desired, formed integrally with the cab underframe 8. The structure so far described is well-known in the art, together with other usual structural details but inasmuch as the same do not form a part of my present invention it is not deemed necessary to describe such structure.

A king pin 20 extends vertically through an opening 21, Fig. 5, formed in the underframe 8 and through an opening 22, Fig. 2, in the center pin seat and thence through a transversely elongated slot 23 formed in the transom platform 16. The slot and two openings are of sufficient size to permit a sleeve 24 to surround the king pin for its full length, this sleeve being held in position by a nut 25 threaded to the lower end of the king pin. The opening 21, Fig. 5, is partially intersected by a second opening 26 which is enlarged to receive a head 27 on the king pin, the two intersecting openings broadly forming an elongated opening or slot.

In operation, the king pin 20 is first inserted through opening 22 and slot 23 so that head 27 rests upon boss 30 of opening 22. The underframe 8 is then lowered so that its center pin structure 18 is normally seated in center pin bearing as shown in Fig. 4. The king bolt 20 is now pushed upwardly and simultaneously shifted laterally specifically by being inclined as shown in dotted lines, Fig. 4, it being understood that opening 22 is of such diameter as to allow the king bolt to be inclined sufficiently to bring head 27 in vertical alignment with enlarged opening 26 through which the head is then passed. When head 27 is clear of the upper surface 31 of the underframe, the king bolt is then broadly radially moved to its vertical central position specifically by being tilted to a vertical position so that the shank of king pin 20 is disposed coaxially in small opening 21. To lock the king bolt in its normally operative position within opening 21 sleeve 24 is inserted upwardly over pin 20 through slot 23 and opening 22 and held in position by the nut 25. The sleeve 24 is of such diameter as to substantially fill the opening 22 thereby preventing the king bolt from accidentally or otherwise swinging to an inclined position. Accordingly head 27 is maintained in full bearing contact with the upper frame surface 31. To remove the king pin the reverse operation is employed, namely, loosen nut 25 and drop sleeve 24 from the king pin thereby enlarging the clearance in opening 22 whereupon the king pin may be swung transversely to the dotted line position as shown in Fig. 2 and dropped through the enlarged opening 26 to a point beneath the same and thereafter head 27 may rest upon boss 30. Thus it is seen that the sleeve 24 broadly constitutes means for locking the king pin in its operative position and for allowing movement of the king pin for removal or insertion.

From the foregoing disclosure it is seen that I have provided an extremely simple, convenient and rapid means for placing the king pin in its operative position or for removing the same therefrom, while at the same time providing a positive, rugged and safe means for locking the king bolt in position.

It will of course be understood that various changes in details of construction and arrangement of parts may be made by those skilled in the art without departing from the spirit of the invention as set forth in the appended claims.

I claim:

1. In combination, a truck frame and another frame supported thereon, said frames having vertically aligned openings, a king pin insertable substantially vertically through said openings for operatively connecting said frames, and said openings being adapted to allow said king pin to have radial movement into said operative position while said other frame is in its supported position on the truck.

2. In combination, a truck frame and another frame supported thereon, said frames having vertically aligned openings, a king pin extending vertically through said openings for operatively connecting said frames, said openings being adapted to allow said king pin to be inclined during insertion into said openings, means to allow said pin when it is only fully inserted to be moved laterally into said vertical operative position, and means for locking said king pin in said operative position 3. In combination, a truck frame and another frame supported thereon, said frames having vertically aligned openings the upper one of which is larger than the lower one, a king pin extending vertically through said openings for operatively connecting said frames and having a head that can pass through said larger opening but be moved so as to overlap and rest on the edge portion thereof, and said openings being adapted to allow said king pin to be inclined during insertion into both of said openings and only thereafter to be moved laterally so that said pin head is brought into said overlapping relation.

4. In combination, a truck frame and another frame supported thereon, said frames having vertically aligned openings, a king pin extending vertically through said openings and having a head for operatively connecting said frames, said openings being adapted to allow said king pin to be inclined during insertion into both of said openings and only thereafter to be swung to said vertical operative position, and means for preventing said king pin from having an inclined removable position after being placed in said operative position.

5. In combination, a truck frame and another frame supported thereon, said frames having vertically aligned openings, a king pin extending vertically through said openings for operatively connecting said frames, and means requiring said king pin to be inclined when removed from the same, said openings being adapted to allow said inclination of the king pin to effect removal from said operative position.

6. In combination, a truck frame and another frame supported thereon, said frames having vertically aligned openings, a king pin extending vertically through said openings for operatively connecting said frames, at least one of said openings being laterally elongated with an enlarged end to allow removal of said king pin while the smaller end of said opening supports said pin in its operative position, and means within one of said openings for reducing the clearance between the king pin and the walls of one of said openings to lock the king pin when in its operative position.

7. In combination, a truck frame and another frame supported thereon, said frames having vertically aligned openings, the openings in one of said frames being elongated with one end enlarged to receive a king pin head and the other end being smaller to receive a king pin shank, and a king pin normally extending vertically through said truck frame opening and through the small end of said elongated opening, said king pin head being movable in one direction through said enlarged opening when the king pin is laterally displaced from its normal position while said frames remain in their normal supporting contact with each other thereby allowing the king pin to be removed from or inserted into its operative position and said king pin having a head of such size that it rests upon said other frame.

8. In combination, a truck frame and another frame supported thereon, said frames having vertically aligned openings, the truck frame opening being relatively large and the other frame opening being elongated with a large end and a small end, a king pin extending vertically through said openings for operatively connecting said frames and having a head engaging said other frame when in said operative position, and said truck frame opening being of such size as to allow the king pin to be inclined so that the pin head is adapted to be swung into alignment with and passed through the enlarged end of the other frame opening and thereafter to be swung into said vertical operative position with the king pin head resting upon said other frame, and means for holding said king pin in said vertical position.

JOHN EDGAR SMITH.